I. KEY.
PAN LIFTER.
APPLICATION FILED FEB. 25, 1911.
993,253.
Patented May 23, 1911.
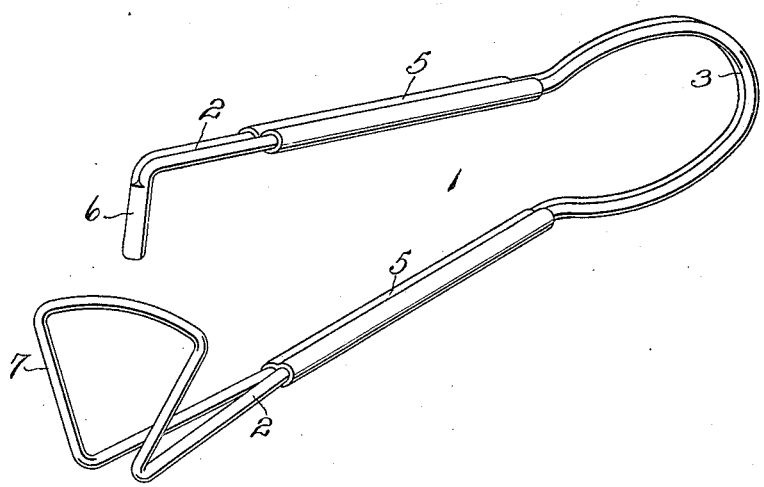
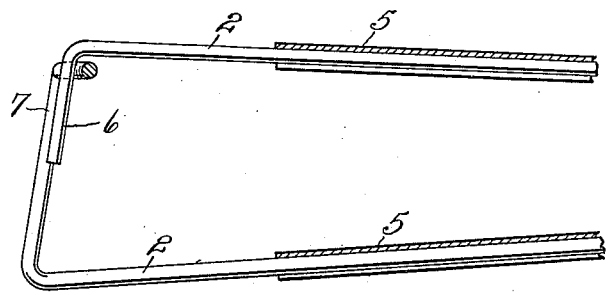
Witnesses
J. P. Britt
b. M. Gould
Inventor
Isaac Key,
By
Attorney

UNITED STATES PATENT OFFICE.

ISAAC KEY, OF FOWLERTON, INDIANA.

PAN-LIFTER.

993,253.　　　Specification of Letters Patent.　　Patented May 23, 1911.

Application filed February 25, 1911. Serial No. 610,801.

*To all whom it may concern:*

Be it known that I, ISAAC KEY, citizen of the United States, residing at Fowlerton, in the county of Grant and State of Indiana, have invented certain new and useful Improvements in Pan-Lifters, of which the following is a specification.

My invention relates to improvements in that class of devices which may be termed pan lifters.

The invention has for its object primarily to provide for the ready or convenient lifting of the pan when hot from a stove without direct contact therewith of the hands or invoking the aid of a cloth or the like for that purpose.

A further object of the invention is to carry out said ends in an exceedingly simple, economical and effective manner and to reduce the cost of manufacture to the minimum.

The invention consists of certain features or instrumentalities substantially as hereinafter fully disclosed and defined by the claim.

In the accompanying drawing illustrating the preferred embodiment of my invention: Figure 1 is a perspective view of the device in its ineffective position, the pan engaging members or jaws being sprung away from each other. Fig. 2 is a fragmentary vertical section of the same produced in the axial plane thereof, with the members or jaws sprung or compressed into effective position, as in engaging the interposed pan rim.

In carrying out my invention I form the same from stout spring metal wire, the body portion, designated generally by the reference character 1, being approximately V-shaped in general outline, the arms 2 thereof at the bottom of the V being, however, rounded or curved, as at 3, instead of angular, for obtaining greater resiliency at that point than would otherwise be the case, the purpose of which will be apparent in connection with the operation of the device. The wire forming the body, together with the subsequently described or designated parts of the device, is doubled upon itself, the resulting duplicate members or portions being bound or clamped firmly together, preferably by means of tubular metal pieces or sleeves 5 suitably crimped or otherwise secured thereon. Said resulting duplicate portions or members of the body forming wire 1 are formed at one end into a right angled terminal or jaw 6, being suitably brazed or soldered together, while they diverge or incline laterally at the other end; the thus diverging portions being next bent at right angles to the axis of the device and diverge laterally, and having the uniting portion thereof of slight arcuate or curved outline to conform to the curvature of the outside of the pan rim for obvious reasons, it being noted that the upper jaw 6 is received within the arcuate portion of the lower jaw, a second jaw 7 thus being formed. It will be noted that the upper jaw 6 is slightly inclined outwardly or forwardly and is arranged about centrally with respect to the lower jaw, while the lower jaw 7 inclines slightly inwardly, the relative arrangement of said jaws being such that, as the lower jaw is suitably presented to the pan rim upon its outer surface, the upper jaw will be adapted to frictionally engage the pan rim upon its inner surface and about centrally with respect to the lower jaw, this being effected, of course, as pressure is applied to the arms 2 of the body 1 by suitably grasping and compressing the same, as will be apparent. After thus readily gripping and removing the pan from the stove, it will be noted that, as the pressure of the hand is relaxed, the jaws of the device will spring out of engagement with the pan rim and thus become disengaged therefrom.

I claim:

A pan lifter, comprising a continuous resilient wire formed into approximately V-shaped outline, the resulting arms thereof terminating in jaws arranged at right angles to the axes of said arms and initially standing apart, the lower jaw having upstanding upwardly diverging lateral portions, the lower ends of which are formed in continuation of forwardly diverging lateral portions of one of said arms, the upper ends of said jaw lateral portions having an arcuate connecting portion, the upper jaw being arranged about centrally of the lower jaw, said jaws being outwardly and inwardly inclined, respectively, the upper jaw being adapted, as said jaws are compressed, to be received within the arcuate connecting portion of said lower jaw to provide for the engagement of the jaws with the inner and outer surfaces of the pan-rim.

In testimony whereof I affix my signature in presence of two witnesses.

ISAAC KEY.

Witnesses:
F. M. HARDESTY,
F. B. VAN ANTWERP.

Copies of this patent may be obtained for five cents each, by addressing the "Commissioner of Patents, Washington, D. C."